United States Patent [19]

Poore et al.

[11] 4,136,751
[45] Jan. 30, 1979

[54] POWER DIVIDER WITH GOVERNED SPEED CONTROL

[75] Inventors: Wesley A. Poore; Edward F. Randolph; Harvey W. Rockwell, all of Springfield, Ill.

[73] Assignee: Fiat-Allis Construction Machinery, Inc., Deerfield, Ill.

[21] Appl. No.: 736,722

[22] Filed: Oct. 29, 1976

[51] Int. Cl.² ............... B60K 25/00; F16H 37/14
[52] U.S. Cl. .................... 180/70 R; 74/665 F; 74/674
[58] Field of Search ........... 180/70 R, 53 R; 74/687, 74/655 F, 655 G, 711, 681, 674

[56] References Cited

U.S. PATENT DOCUMENTS

| | | | |
|---|---|---|---|
| 3,286,543 | 11/1966 | Porter | 74/687 X |
| 3,424,029 | 1/1969 | Horsch et al. | 74/665 F |
| 3,987,689 | 10/1976 | Engle | 74/711 |
| 4,041,804 | 8/1977 | Clark | 74/711 |

*Primary Examiner*—John A. Pekar
*Attorney, Agent, or Firm*—August E. Roehrig, Jr.; Robert A. Brown; Harvey W. Rockwell

[57] ABSTRACT

A power divider system with governed speed control wherein a first power path and a second power path are formed by a differential-like power divider. A control system associated with the two power paths senses and controls the speed relationship thereof. The speed of an output element of the second power path is determined and then governed to a predetermined value by modulated transfer of power from the second power path to the first power path. The speed of an output element of the first power path is limited relative to the output element of the second power path by the transfer of power from the first power path to the second power path through a one-way drive system. A power transfer mechanism for governing the second power path to the predetermined speed provides fail-safe operation.

13 Claims, 6 Drawing Figures

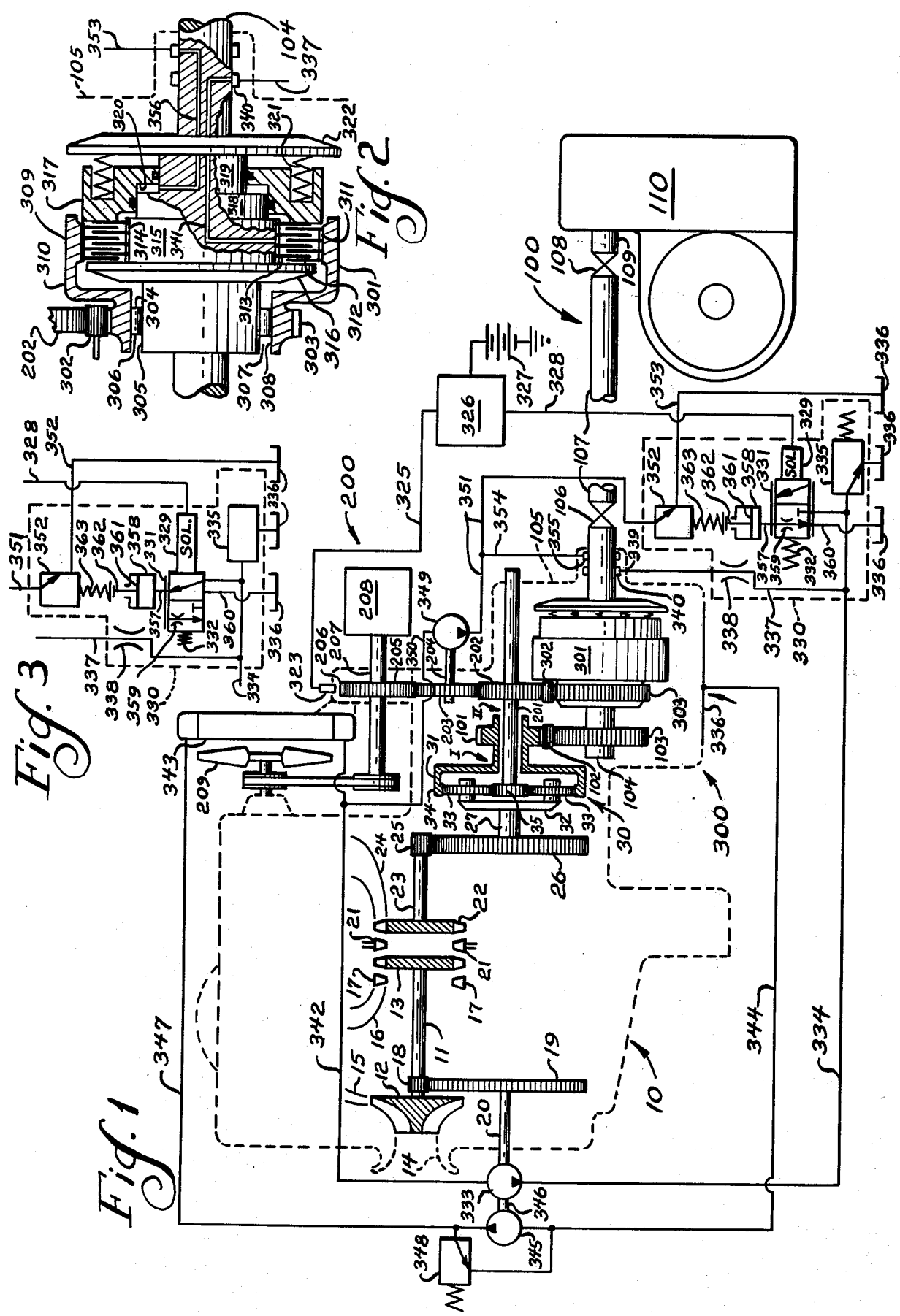

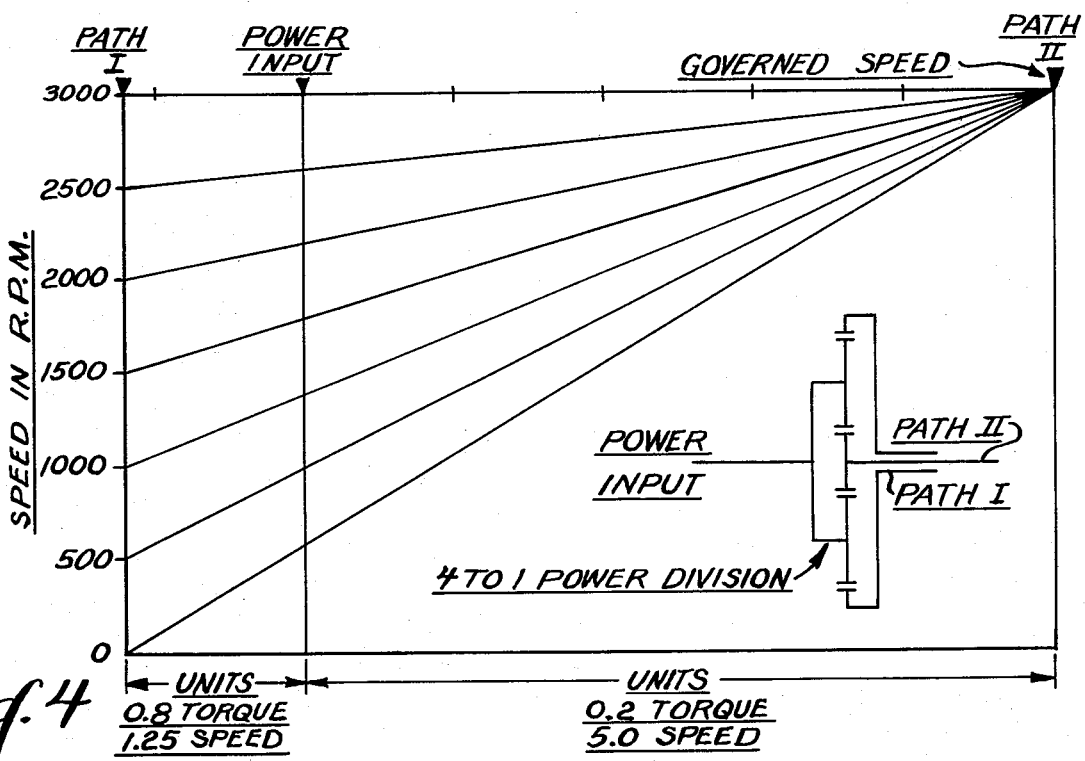
*Fig. 4*
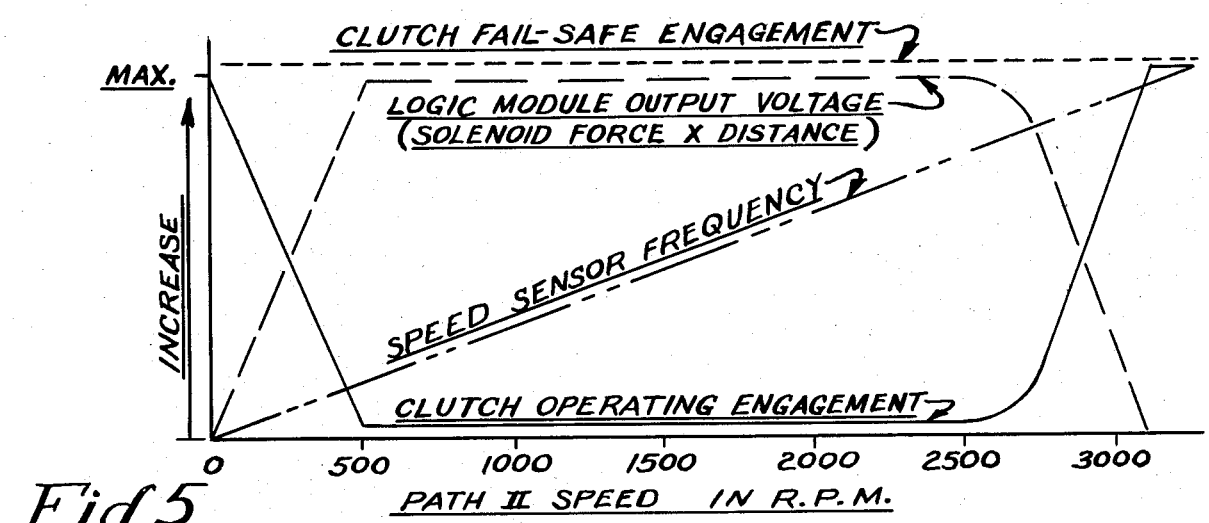
*Fig. 5*
*Fig. 6*
| PATH II SPEED | SENSOR FREQUENCY | LOGIC MODULE OUTPUT VOLTAGE | SOLENOID ACTION | CLUTCH HYDRAULIC PRESSURE | CLUTCH TORQUE |
|---|---|---|---|---|---|
| 0 - 500 | ZERO TO LOW | ZERO TO HIGH | NONE TO STRONG | MIN. TO MAX. | MAX. TO MIN. |
| 500 - 2500 | LOW TO HIGH | HIGH | STRONG | MAX. | MIN. |
| 2500 - 3000 | HIGH TO MAX. | HIGH TO LOW | STRONG TO WEAK | MAX. TO MIN. | MIN. TO MAX. |

POWER DIVIDER WITH GOVERNED SPEED CONTROL

BACKGROUND OF THE INVENTION

1. Field of Use

This invention relates generally to automotive vehicles having multiple power demand functions such as vehicle propulsion and various auxiliary powered equipment. More particularly, but not exclusively, this invention relates to construction machinery vehicles commonly known as loaders, scrapers, dozers, graders, and machines which have relatively great auxiliary power requirements for operating associated implements, tools, or other vehicle and engine support equipment. The invention is particularly adaptable to vehicles in which the power source is a free-turbine-type gas turbine engine having torque multiplication characteristics and other power sources in which the output is through fluid torque converters as well as power sources which have relatively high torque backup characteristics.

2. Description of the Prior Art

Auxiliary equipment power-take-off generally known in the present day construction machinery vehicle art are usually associated with, and driven by, a rotating housing fluid torque converter having a power-take-off speed exactly in proportion to engine speed at any load condition. One serious problem associated with this arrangement is that under heavy propulsion power requirements, to as much as converter stall, the vehicle engine speed is reduced appreciably lower than that under light propulsion power requirements. This reduced speed has a noticeable adverse effect on the performance of the auxiliary powered or work performing implements. For example, a loader vehicle equipped with a material handling bucket requires high tractive effort, or propulsion, to force the bucket into a bank of material when, simultaneously, the auxiliary powered equipment, such as a hydraulic pump driven by the power-take-off, is transferring power to raise the bucket through the bank of material. During the operating cycle vehicle forward motion may be stalled, or nearly so, resulting in reduced engine speed and, therefore, reduced power output of the hydraulic pump resulting in a slower than desired raising of the bucket.

Other solutions to overcome inadequacy of power-take-off arrangements have been proposed such as represented in U.S. Pat. No. 2,842,273 wherein engine power output is divided by a planetary gear assembly. Prior art pertaining to gas turbine engine powered vehicles is notably limited particularly with regard to applications utilizing the torque multiplying characteristics of free-turbine-type gas turbine engines. This type of engine either has no mechanical connection between the compressor shaft and the power turbine shaft or is sometimes provided with a mechanical connection such as a slipping clutch with modulating control. Power available for auxiliary equipment from the engine compressor shaft, in either configuration, is limited. The power requirements of the auxiliary equipment reduces the compressor speed thereby reducing air intake and resulting in a serious adverse effect on engine performance. The limited auxiliary power output capability of the compressor shaft is sufficient for some gas turbine engine applications but is insufficient for most construction machinery. In addition, attempts have been made to power construction machinery vehicles by gas turbine engines simply by replacing the diesel engine and retaining the conventional fluid torque converter and auxiliary power-take-off. Such modification does not take advantage of the torque multiplying characteristic of the free-turbine-type engine design, in expensive and still suffers the same disadvantages of reduced engine speed and lower horsepower output at converter stall as a diesel engine with torque converter.

SUMMARY OF THE PRESENT INVENTION

It is, therefore, an object of this invention to divide the output of a power source into two intercontrolled power paths.

It is another object of the present invention to control the output speed from the drive element of one power path to operate at not more than a predetermined speed of rotation even though the output speed from the drive element of another power path driven from the same variable speed power source may vary between zero and maximum.

It is another object of the present invention to prevent a load demand on one power path from resulting in uncontrolled output speeds from the drive element of the one path relative to the output speed from the drive element of the other power path.

Yet another object of the present invention is to prevent overspeed and possible self-destruct of mechanisms associated with the power paths if malfunction occurs in the control system thereof.

Still another object of the present invention is to utilize the torque multiplying characteristics of free-turbine-type gas turbine engine power for vehicle propulsion and at the same time provide adequate power to the vehicle auxiliary powered equipment.

These and other objects are attained in accordance with the present invention wherein there is provided a power divider system with governed speed control wherein a first power path and a second power path are formed by a differential-like power divider. A control system associated with the two power paths senses and controls the speed relationship thereof. The speed of an output element of the second power path is determined and then governed to a predetermined value by modulated transfer of power from the second power path to the first power path. The speed of an output element of the first power path is limited relative to the output element of the second power path by the transfer of power from the first power path to the second power path through a one-way drive system. A power transfer mechanism for governing the second power path to the predetermined speed provides fail-safe operation.

DESCRIPTION OF THE DRAWINGS

Further objects of the invention, together with additional features contributing thereto and advantages accruing therefrom, will be apparent from the following description of a preferred embodiment of the invention when read in conjunction with the accompanying drawings, wherein:

FIG. 1 is a schematic diagram of a free-turbine-type gas turbine engine and an associated power divider system in accordance with the invention;

FIG. 2 is a partial cross section enlargement of the power transfer assembly of FIG. 1;

FIG. 3 is a schematic diagram showing the hydraulic control assembly of FIG. 1 in a clutch releasing attitude;

FIG. 4 is a graphic presentation showing relative performance characteristics of the power input and the two power paths in accordance with preferred planetary gear ratios of the invention;

FIG. 5 is a graphic presentation showing a preferred logic module conversion of a sensed speed signal to a plurality of distinct control phases for control of clutch engagement and showing the resulting clutch torque capability;

FIG. 6 is a chart having reference to FIG. 5 indicating performance to different control components and functions.

DESCRIPTION OF A PREFERRED EMBODIMENT

Referring to FIG. 1, the present invention is particularly well adapted for use with a power source 10 such as a free-turbine-type gas turbine engine in which a compressor shaft 11 has a compressor 12 driven by a compressor turbine 13. Air entering through an inlet 14 is compressed by the compressor 11 and forced through an air passage 15 to a combustion chamber, not shown, for mixing with fuel which is then ignited. The resulting expanding gases pass through a combustion duct 16 and are then directed by a plurality of fixed nozzles 17 for rotating the compressor turbine 13, the compressor shaft 11, and the compressor 12. The compressor shaft 11 also has an accessory drive pinion 18 fixed thereon in mesh with an accessory drive gear 19 mounted on an accessory drive shaft 20 for driving relatively lightly loaded accessories.

The expanding gases, after having driven the compressor turbine 13, are then directed by a plurality of variable nozzles 21 to effect rotation of a power turbine 22 fixedly connected to a turbine shaft 23. The gases now having expended their kinetic energy are directed through an exhaust duct 24 and through heat exchangers (not shown), for transfer of heat to air entering the combustion chamber through the air passage 15. Rotation of the power turbine 22 rotates a turbine pinion 25 fixed to the turbine shaft 23 to drive a power output gear 26 which is fixed to a power output shaft 27.

It will be noted that in the gas turbine engine illustrated in FIG. 1 there is no mechanical connection between the compressor shaft 11 and the turbine shaft 23. It is this design characteristic of the free-turbine-type gas turbine engine that provides the capability of torque multiplication at the power output shaft 27. It is not uncommon to find engine designs at full throttle operation in which torque multiplication at turbine stall is two times the torque at full speed. This characteristic is basically the same as is found with regard to impeller and turbine members of fluid (hydraulic) torque converters. Although this characteristic is very desirable for vehicle propulsion usage it is totally unacceptable in that form as a source of power in the magnitude required for previously referred to auxiliary equipment associated with most construction machinery.

From the foregoing it is apparent that power in the form delivered by the power turbine i.e., full speed to stall conditions, must therefore be altered in order to provide a predetermined governed power-take-off speed delivery to the auxiliary drive system. In the present invention this is accomplished by a differential-like power divider system generally identified by numeral 30 comprised basically of a planetary gear assembly 31. A planet pinion carrier 32 carried by the power output shaft 27 provides a power input to the planetary gear assembly 31. A plurality of planet pinions 33 rotatably mounted on the planet pinion carrier 32 mesh with a ring gear 34 thereby providing a first power path generally identified by the Roman numeral I representing a vehicle propulsion drive system herein generally identified by the numeral 100.

The planet pinions 33 also mesh with a sun gear 35 which thereby provides a second power path generally identified by the Roman numeral II representing an auxiliary drive system generally identified by the numeral 200.

With further reference to FIG. 1, path I has power input by way of the ring gear 34 to a propulsion drive gear 101 connected therewith which represents the output element of path I and which meshes with a first idler gear 102 (partially shown). The first idler gear 102 drives a propulsion shaft gear 103 fixed to a propulsion shaft 104 which extends through a wall of a housing represented by numeral 105. The propulsion shaft 104 is coupled with a first universal joint 106 at one end of a propeller shaft 107 which has its other end coupled to a second universal joint 108. The second universal joint 108 is connected for driving a transmission input shaft 109 of a vehicle transmission and axle assembly 110 for propelling the vehicle.

Again referring to the planetary gear assembly 31, it will be seen that the gear 35 provides the power input to path II which drives the previously identified auxiliary drive system 200. Path II includes an auxiliary drive shaft 201 on which an auxiliary drive gear 202 represents the output element of Path II and is fixed in driving relation with a first power-take-off gear 203 mounted for driving a first shaft 204. The first power-take-off gear 203 drives a second power-take-off gear 205 fixed to a second shaft 207 for driving a hydraulic system pump 208 or similar devices for operating vehicle implements and tools. Other power absorbing devices including engine and vehicle support equipment such as a cooling fan 209 may be driven from the second shaft 207 or from an extension of the auxiliary drive shaft 201.

It is to be understood that differential-like devices other than planetary gear systems may be employed for providing the power transmission ratio division.

Attention is now directed to a power control system generally identified by the numeral 300 of FIG. 1 and in which further details are shown in FIG. 2 and FIG. 3. The power control system 300 more specifically includes a power transfer assembly identified by numeral 301 and shown in particular detail in FIG. 1. It will be noted that the auxiliary device gear 202 meshes with a second idler gear 302 (partially shown). A clutch gear 303 meshes with the second idler gear 302 and is installed for one-way rotation in relation to the propulsion shaft 104 by one way drive means in the form of a one-way clutch 304. The one-way clutch 304 is comprised of an external surface 305 formed in fixed relation to the propulsion shaft 104 for engagement with a plurality of sprag-type members 306 contained in an annular space 307 provided between the external surface 305 and an internal surface 308 formed internally of the clutch gear 303. An example of suitable one-way clutches are sometimes referred to as overrunning clutches of the type manufactured by the Formsprag Company, Warren, Michigan.

Further, with reference to the power transfer assembly 301 of the control system 300, a friction clutch 309 is provided comprised of a cylindrical portion 310 formed as an extension of the clutch gear 303. The cylindrical portion 310 has a plurality of internal teeth 311 formed on the inside diameter thereof for drivingly engaging a plurality of friction members 312 which are alternately assembled with relation to a plurality of clutch discs 313. The clutch discs 313 drivingly engage a plurality of external teeth 314 formed on a hub 315 which is fixed with relation to the propulsion shaft 104. A clutch end flange 316 is also fixed with relation to the propulsion shaft 104 and is in abutting relation with the alternately assembled friction members 312 and the clutch discs 313. A clutch pressure member 317 is axially movable on a set of stepped external diameter surfaces 318 and 319 associated with the propulsion shaft 104. A corresponding set of stepped internal diameters are formed in the clutch pressure member 317 and include fluid seals in axially sliding contact with the external diameter surfaces 318 and 319. The combination of the seals and the set of stepped diameter surfaces 318 and 319 provide an expandable fluid chamber 320 which is effective upon introduction of hydraulic pressure to move the clutch pressure member 317 away from engagement with the friction members 312 and the clutch discs 313. The friction clutch 309 is normally engaged by means of a plurality of clutch springs 321 acting on the clutch pressure member 317 and against a spring reaction flange 322 fixed with relation to the propulsion shaft 104. Normal engagement of the friction clutch 309 by springs 321 serves to provide fail-safe operation of the system.

It can now be seen that the friction clutch 309, being interposed between path I and path II, when provided with appropriate controls hereinafter described, is an effective means for governing the speed of path II by modulatingly regulating the transfer of power from path II to path I.

Sensing the speed of path II for controlling the friction clutch 309 can be accomplished by several methods. Generally suitable means are: a mechanical flyball device, a hydraulic pump and control for producing pressure proportional to speed, an electric generator for producing voltage variable in proportion to speed or a magnetic pickup electrically signalling a frequency change in proportion to speed. The preferred embodiment of shaft speed sensing disclosed herein is well known in the art and comprises a magnetic pickup 323 placed in proximity to teeth 206 of the second power-take-off gear 205 which is a rotating element driven by path II. A linear frequency signal is produced by the teeth 206 passing the magnetic pickup 323 whereby low speed rotation of the gear 205 produces a low frequency signal and high speed rotation produces a relatively high frequency. An electrical conductor 325 transmits the linear frequency signal from the magnetic pickup 323 to a logic module 326 which receives electrical energy from a battery 327. The frequency signal is converted in the logic module 326 into a plurality of distinct control phases represented by different levels of voltage output with predetermined values associated with different speed ranges of path II to be described later in more detail with reference to FIG. 5 and FIG. 6.

The plurality of control phases produced by the logic module 326, in the form of electrical voltage, are conducted by an electric control conductor 328 to a solenoid 329 which is associated with a hydraulic control assembly 330 shown in FIG. 1 and FIG. 3. The solenoid 329 operates a metering valve 331 which is spring biased to closed-to-pressure position by a metering valve spring 332. Hydraulic pilot pressure for the metering valve 331 is provided by a pilot and lube pump 333 which is driven from the accessory drive shaft 20. The pilot and lube pump 333 output is through a pilot and lube pressure line 334 with pressure regulated by a pilot pressure relief valve 335 from which excess fluid is dumped to a sump 336 formed in the housing 105. An extension of the line 334 connects the pump 333 to the valve 331. Fluid is also directed through a lube line 337 from the line 334 through a lube restrictor orifice 338 to a lube port 339 and to an annular lube recess 340 formed in the housing 105 surrounding the propulsion shaft 104. A lube passage 341 is formed in the propulsion shaft 104 for conducting hydraulic fluid radially through a plurality of holes (one being shown), located for lubricating and cooling the friction members 312 and the clutch discs 313 at their frictional contact surfaces.

Hydraulic fluid for actuating the metering valve 331 is provided by the pump 333 drawing hydraulic fluid through a feed line 342 from an oil cooler 343 after having been transferred from the sump 336 through a sump line 344 by a transfer pump 345 which is driven by a coupling 346, associated with the control pilot and lube pump 333. The fluid flows through a transfer line 347 to the oil cooler 343 from which it is available as demanded by the pump 333, and another pump yet to be described. Excess fluid delivered by the transfer pump 345 is recirculated through a transfer relief valve 348 which is set at a pressure value only sufficient to accomplish the fluid transfer from the sump 336 to the oil cooler 343.

A clutch control hydraulic circuit is comprised of a control pump 349 driven by the shaft 204 from the power-take-off gear 203. However, in some installations it may be preferred to drive the control pump 349 from the accessory drive shaft 20. The pressure fluid from the control pump 349, obtained through a branch line 350 connecting with the feed line 342 from the oil cooler 343, is conducted through a control pressure line 351 to a clutch pressure control valve 352 which is normally open for fluid to be conducted through a return line 353 for return to the sump 336. A control pressure branch line 354 is connected to an annular control pressure recess 355 formed in a portion of the housing 105 surrounding the propulsion shaft 104. A control pressure passage 356 conducts fluid axially through the propulsion shaft 104 then radially outward for communication with the expandable fluid chamber 320 for moving the clutch pressure member 317 axially in opposition to the clutch springs 321.

Now with further reference to the hydraulic control assembly 330 in FIG. 1 it is noted that the solenoid 329 is deenergized and the metering valve 331, as previously noted, is in a closed-to-pressure position. In this condition a pilot pressure passage 357 serves to connect a hydraulic actuator assembly 358 through a restrictor orifice 359 to a return line 360 for return of fluid to the sump 336. The hydraulic actuator assembly 358 is comprised of a piston 361 and a piston rod 362 which is in abutting relation to a control valve spring 363.

FIG. 3 serves to illustrate the various elements of the hydraulic control assembly 330 when the solenoid 329 is energized. The metering valve 331 is shifted to the left against the spring 332. The pilot pressure passage 357 connecting the hydraulic actuator 358 to the pilot and lube pressure line 334 is, therefore, opened for fluid pressure to act on the piston 361. The piston rod 362 attached to the piston 361 compresses the control valve spring 363 which closes the clutch pressure control valve 352. The resulting pressure increase in the control pressure line 351 and the control pressure branch line 354 is conducted to the expandable fluid chamber 320 reference FIG. 2. The pressure in the chamber 320 thereupon moves the clutch pressure member 317 against the clutch springs 321 thereby releasing the friction clutch.

It is to be understood that although the hydraulic control assembly 330 in FIG. 1 and in FIG. 2 show the various elements for full engagement and full release respectively of the friction clutch 309, the control elements have modulating capability for infinitely varying fluid pressure in the chamber 320. The infinitely variable pressure in the chamber 320 results in infinitely variable or modulated control of torque delivered from path II to path I.

A predetermined maximum governed speed for path II has been selected at a value of approximately 3000 RPM. Power input to the power divider system 30 is also selected to be at a speed of 3000 RPM maximum. In the preferred embodiment, the planetary gear assembly 31 has gear ratios that provide torque division in the order of 4 to 1 as graphically shown in FIG. 4. Therefore, for each unit of torque input, 0.8 units (80%) is delivered into path I and 0.2 units (20%) is delivered into path II. With regard to speed of rotation, (assumed to be without benefit of the present invention) if path II is prevented from rotating, the path I speed of rotation is 1.25 times input speed and path II speed of rotation is 5 times input speed. For example, input speed of 3000 RPM at the planet pinion carrier 32, when path I is held stationary, would result in a potential speed of 15,000 RPM at the sun gear 35 input to path II.

With further reference to FIG. 4, it will be seen by graphic illustration the effect of governing the path II speed, for example, at 3000 RPM. A family of straight lines terminate at a common point on a vertical line representing path II spaced horizontally to the right in a ratio scale of 5 units with relation to a vertical line representing power input. Another vertical line spaced horizontally to the left of the power input line is in a ratio scale of 1.25 units representing path I. A vertical speed scale starting at zero from a bottom horizontal line is graduated in 500 RPM increments to a 3000 RPM top horizontal line. The aforementioned family of straight lines originating at the 500 RPM increments on the path I line converge at the 3000 RPM path II point after crossing the power input line. At a given path I speed, and the governed 3000 RPM path II speed, a resulting power input speed is determined by projecting the crossing point of the family of lines with the vertical power input line to the left and reading the Speed in RPM scale. It is to be understood that the family of lines are in reality infinite in number and not limited to increments of 500 RPM on the speed scale.

It is particularly interesting to note that when path I (vehicle propulsion) is stalled (zero RPM) and path II is governed at 3000 RPM that the power input speed is 600 RPM. If a gas turbine engine at full throttle has a stall torque multiplication of 2, this 600 RPM speed represents a torque multiplication of approximately 1.8 delivered for vehicle propulsion through path I while path II is at 3000 RPM.

Maximum governed speed of path II, as was previously indicated, is controlled by modulatingly engaging and disengaging the friction clutch 309. Speed sensing for control of the friction clutch 309 is provided by the frequency signal produced by the teeth 206 of the gear 205 passing in proximity to the magnetic pickup 323. The speed sensor frequency is converted by the logic module 326 into a plurality of distinct control phases depicted in FIG. 5 as logic module output voltage. It is seen that a horizontal scale shows path II speed in increments of 500 RPM from 0 to 3000. The speed sensor, comprised of the magnetic pickup 323 and the teeth 206, produces the linear frequency signal shown by a line constructed of long dashes and short dashes starting at zero speed and zero frequency and extending diagonally to maximum frequency at over 3000 RPM. A predetermined tailoring of voltage output by the logic module 326 is represented by a long dash line showing a voltage increase from 0 to maximum during path II speed from 0 to 500 RPM, representing a first control phase. The voltage continues at maximum from 500 RPM to approximately 2500 RPM, representing a second control phase, then slopes downward to 0 at a path II speed of slightly over 3000 RPM which represents a third control phase. The voltage changes for the three control phases are produced by the logic module in a manner not defined in the present invention, but which art is well developed in the field of electronics. The logic module output voltage for the three phases is exactly reproduced into solenoid force times distance and is so indicated. The resulting clutch operating engagement representing torque transmitting capability is identifiable by a solid line. A horizontal line of short dashes indicates spring applied clutch fail-safe engagement in event of control system malfunction.

The table of FIG. 6 provides details concerning the performance of various control components including some of those that were graphically illustrated in FIG. 5 at path II speeds of 0 to 500, 500 to 2500 and 2500 to 3000 RPM.

Operation may be best described by considering different operating situation of a vehicle embodying the present invention. For example, a situation is frequently encountered in which there is a high propulsion power demand on path I and a minimum power demand on path II. If the difference in power demand ratio is greater than the 1 to 4 provided by the planetary gear assembly 31, the tendency is for path II to overspeed and possibly self-destruct and for minimum power to be delivered to path I. The present invention anticipates this situation and responds by sensing path II speed and transferring power from path II to path I through the friction clutch 309 of the power transfer assembly 301 in an amount that prevents path II from exceeding the predetermined 3000 RPM.

An example of the one-way clutch 304 function is a situation in which the transmission of the vehicle transmission and axle assembly 110 is in neutral or the power demand on path I is less than 4 times the power demand on path II. The tendency is for path II speed to reduce toward zero and for the speed of path I to increase to as much as 1.25 times power input speed at the planet pinion carrier. (Reference FIG. 4). The one-way clutch of the power transfer assembly 301 serves to prevent the speed of path I from exceeding that of path II therefore effecting power transfer from path I to path II.

A further example of the function of the one-way clutch 304 is evident with the vehicle in a down hill coast or a decelerating situation in which the vehicle momentum tends to drive through ground engaging means, wheels, crawler tracks or the like, through path I to the power source 10. Most engines, particularly industrial gas turbine engines, are characterized in their design by their capability to absorb and dissipate a large amount of vehicle-momentum-induced energy input. This is commonly referred to in the trade as dynamic braking. The present invention anticipates the aforementioned situation in which power path I becomes power input to the planetary gear assembly 31 by way of the ring gear 34. At reduced throttle, the power source 10 how represents a load, and the planet pinion carrier 32, associated with the power source 10, and the sun gear 35, associated with path II, become power output. A control is therefore required to prevent rotation of the path II at an uncontrolled speed in a reverse direction. The one-way clutch 304 conveniently provides the necessary restraint by driving the auxiliary drive shaft 201 in the same direction and speed as the shaft 27 of the power source.

While the present invention has been described and values specified applicable to a preferred embodiment, it will be understood by those skilled in the art that equivalents may be substituted and various changes made without departing from the scope of the invention as represented by the appended claims.

What is claimed is:

1. A power divider system, for dividing the output of a power source into a first power path and a second power path comprising:
    a power dividing means for defining a first and second power path;
    power transfer means, having variable power transmitting capability, interposed between said first power path and said second power path for controlling the relative speeds of the respective output elements thereof and transferring power between said first and second power paths;
    speed sensing means operatively connected with said second power path to determine the speed of the output element coupled thereto; and
    control means operatively connected to said power transfer means and responsive to said speed sensing means for varying said power transfer from said second power path to said first power path in an amount sufficient to govern the speed of said second power path to a predetermined maximum when the power demand on said first power path exceeds a predetermined proportionate value of the power demand on said second power path as determined by a gear ratio of said power dividing means.

2. A power divider system of claim 1 wherein said power transfer means comprises a fluid actuated friction clutch.

3. A power divider system of claim 2 wherein said speed sensing means produces a linear frequency electrical signal in which low frequency is produced at low speed and high frequency is produced at high speed of said second power path.

4. A power divider system, for dividing the output of a power source into a first power path and a second power path comprising
    a power dividing means for defining a first and second power path;
    power transfer means, having variable power transmitting capability, interposed between said first power path and said second power path for controlling the relative speeds of the respective output elements thereof and transferring power between said first and second power paths;
    speed sensing means operatively connected with said second power path to determine the speed of the output element coupled thereto; and
    control means operatively connected to said power transfer means and responsive to said speed sensing means for varying said power transfer from said second power path to said first power path in an amount sufficient to govern the speed of said second power path to a predetermined maximum when the power demand on said first power path exceeds a predetermined proportionate value of the power demand on said second power path as determined by a gear ratio of said power dividing means;
    said control means comprising
    a logic module for converting the speed determination of said speed sensing means into a plurality of control phases;
    a pilot fluid pressure source;
    a valve means in fluid receiving relationship with said pilot fluid pressure source for actuation in response to the plurality of control phases produced by said logic module;
    actuator means in fluid pressure receiving relationship with said valve means and said pilot fluid pressure source;
    a control fluid pressure source in fluid transmitting relationship with said fluid actuated friction clutch, and
    control valve means responsive to said actuator means for varying the fluid pressure produced by said control pressure source for modulatingly adjusting the engagement of said fluid actuated friction clutch.

5. A power divider system, for dividing the output of a power source into a first power path and a second power path comprising a power dividing means having a predetermined gear ratio defining said first and second power paths, and a one-way drive means interposed between a first power path and a second power path for transferring power solely from said first power path to said second power path when the power demand on said second power path exceeds a porportionate value of the power demand on said first power path established by said predetermined gear ratio of said power dividing means, said one-way drive means being ineffective to transfer power from said second power path to said first power path.

6. A power divider system of claim 5 wherein said one-way drive means is a one-way clutch.

7. A power divider system for use in a vehicle having a power source, a propulsion drive system and an auxiliary drive system for dividing and controlling rotary power output of said power source, comprising:
    a planetary gear assembly including an input element driven by said power source, a first output element, and a second output element;
    a first power path having input from said first output element of said planetary gear assembly for providing power to said propulsion drive system of said vehicle;
    a second power path having input from said second output element of said planetary gear assembly for providing power to said auxiliary drive system of said vehicle;
    friction clutch means interposed between said first power path and said second power path for transferring power therebetween for controlling relative speeds thereof;

clutch engaging means for engaging said friction clutch means for effecting transfer of power from said second power path to said first power path;

clutch release means for releasing said friction clutch means in opposition to said clutch engaging means for reducing transfer of power from said second power path to said first power path;

control means responsive to the speed of said second power path for actuating said clutch release means to release and engage said friction clutch means for governing the speed of said second power path to a predetermined maximum value by transferring power from said second power path to said first power path.

8. The power divider system of claim 7 wherein said input element, of said planetary gear assembly, is a planet carrier, said first output element is a ring gear, and said second output element is a sun gear.

9. The powder divider system of claim 8 further including a one-way clutch interposed between said first power path and said second power path for transferring power from said first power path to said second power path when the speed of said first power path exceeds a predetermined speed relationship with reference to said second power path.

10. In a vehicle having a power source, a propulsion drive system and an auxiliary drive system; a power divider system for dividing and controlling rotary power output of said power source; said power divider system comprising:

power dividing means having infinitely variable speed differential between a first output element and a second output element, said power dividing means in power receiving relation to said power source;

a first power path associated with a vehicle propulsion drive system in power receiving relation to said first output element of said power dividing means;

a second power path associated with a vehicle auxiliary drive system in power receiving relation to said second output element of said power dividing means;

power transfer means interposed between said first power path and said second power path for transferring power therebetween when the speed of said second power path exceeds a predetermined value and when the speed of said first power path exceeds a predetermined speed ratio with relation to the speed of said second power path;

speed sensing means, associated with said second power path for determining the speed thereof; and control means responsive to the speed of said second power path determined by said speed sensing means for controlling said power transfer means for transferring power from said second power path to said first power path.

11. The power divider system of claim 10 wherein said power transfer means comrises friction clutch means normally engaged by spring means and disengaged by fluid pressure to provide fail-safe operation of said power divider system operatively connected with said control means for transferring power from said second power path to said first power path in an amount sufficient to govern the speed of said second power path to a predetermined maximum when the power demand on said first power path exceeds a proportionate value of the power demand on said second power path established by a predetermined gear ratio of said power dividing means; and a one-way drive means for transferring power from said first power path to said second power path when the power demand on said second power path exceeds a proportionate value of the power demand on said first power path established by a predetermined gear ratio of said power dividing means.

12. The power divider system of claim 11 wherein said speed sensing means is a magnetic proximity device for producing a linear frequency electrical signal in which low frequency is produced at low speed of said second power path and progressively higher frequency is produced as the speed thereof increases.

13. In a vehicle having a power source, a propulsion drive system and an auxiliary drive system; a power divider system for dividing and controlling rotary power output of said power source; said power divider system comprising power dividing means having an infinitely variable speed differential between a first output element and a second output element, said power dividing means in power receiving relation to said power source;

a first power path associated with a vehicle propulsion drive system in power receiving relation to said first output element of said power dividing means;

a second power path associated with a vehicle auxiliary drive system in power receiving relation to said second output element of said power dividing means;

power transfer means interposed between said first power path and said second power path for transferring power therebetween when the speed of said second power path exceeds a predetermined value and when the speed of said first power path exceeds a predetermined speed ratio with relation to the speed of said second power path;

speed sensing means, associated with said second power path for determining the speed thereof; and control means responsive to the speed of said second power path determined by said speed sensing means for controlling said power transfer means for transferring power from said second power path to said first power path;

said control means comprising a logic module for converting the speed determination of said speed sensing means into a plurality of control phases;

a pilot fluid pressure source;

valve means, having fluid receiving relationship with said pressure source, actuable in response to the plurality of control phases produced by said logic module;

actuator means in fluid pressure receiving relationship with said valve means and said pressure source;

a control fluid pressure source in fluid transmitting relationship with said power transfer means; and control valve means responsive to said actuator means for varying the fluid pressure produced by said control pressure source for modulatingly adjusting the engagement of said power transfer means.

* * * * *